United States Patent Office 3,558,268
Patented Jan. 26, 1971

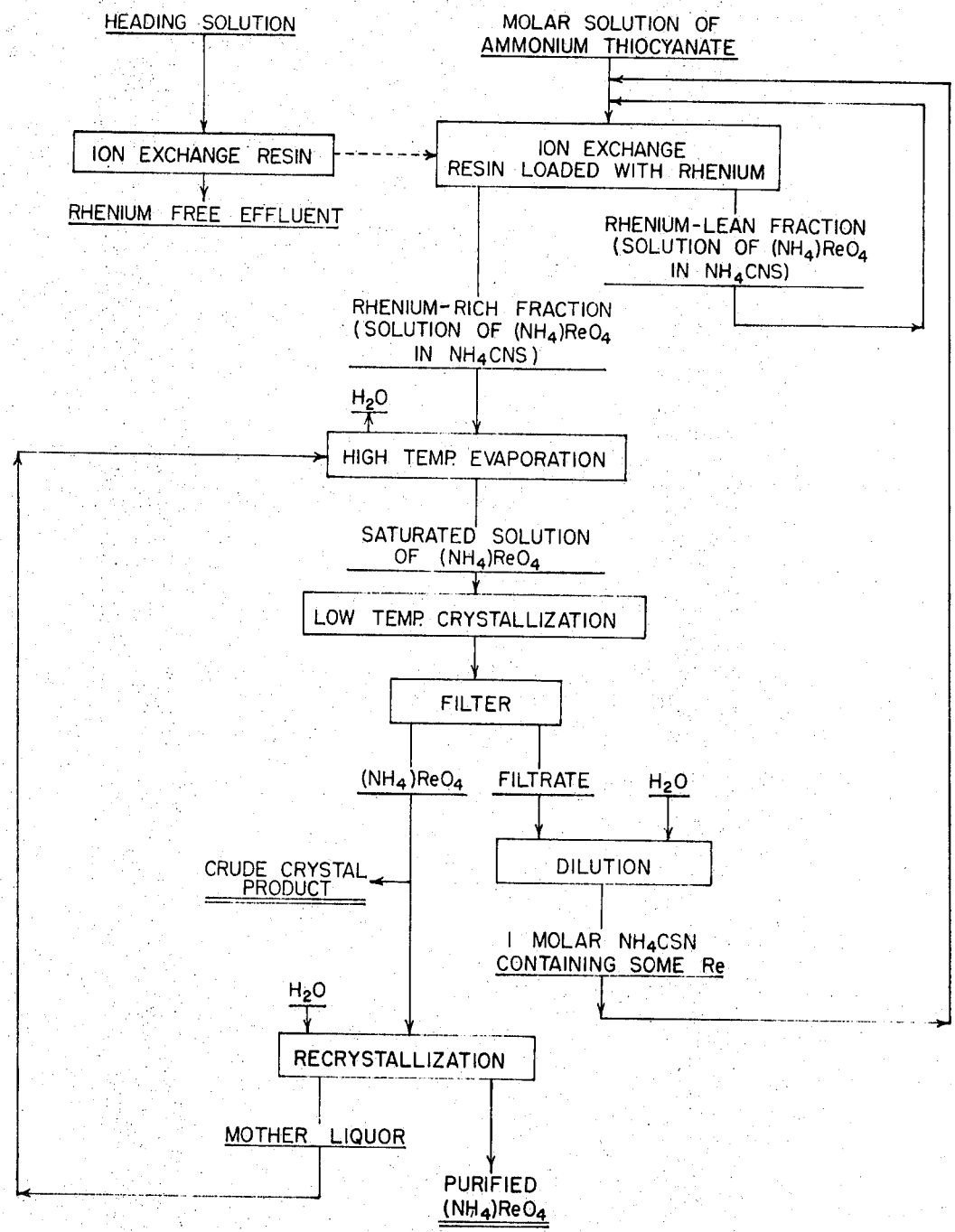

3,558,268
PROCESS FOR RECOVERING RHENIUM VALUES
FROM ION EXCHANGE MATERIALS
John D. Prater and Ronald N. Platzke, Salt Lake City,
Utah, assignors to Kennecott Copper Corporation, New
York, N.Y., a corporation of New York
Filed Nov. 13, 1967, Ser. No. 682,345
Int. Cl. C01g 47/00; C22b 59/00
U.S. Cl. 23—22
11 Claims

ABSTRACT OF THE DISCLOSURE

Rhenium values are extracted from aqueous solutions in conventional manner with ion exchange materials. The rhenium values are then recovered from the ion exchange material by contacting the rhenium-bearing material with an aqueous thiocyanate solution, such as a 1 molar solution of ammonium thiocyanate. Pure crystals of ammonium perrhenate are obtained directly from the thiocyanate solution by crystallization.

BACKGROUND OF THE INVENTION

Field

This invention relates to ion exchange processes for the recovery of rhenium values from solutions containing same. It provides an improved process for the recovery of rhenium values in the form of ammonium perrhenate from either solid or liquid ion exchange materials.

Prior art

Rhenium is often present in small amounts in molybdenum sulfide metallurgical concentrates. When these concentrates are roasted to produce molybdenum oxide, as is customary, the rhenium values are volatilized, usually in the form of rhenium oxides, notably $Re_2O_7$.

It is known to extract the rhenium values from the flue gases and flue dusts of such a roasting operation by contacting them with water or some other solvent for the rhenium, e.g. an acidic or basic aqueous medium. The resulting rhenium-bearing solution contains significant quantities of other elements, notably arsenic, selenium and/or molybdenum. These solutions generally contain various sulfate and chloride contaminants as well as other impurities.

It is further known to extract rhenium values from such rhenium-bearing solutions by various techniques involving ion exchange. According to U.S. Pat. No. 2,876,065, for example, the impure solution is first clarified and then it is passed through conventional ion-exchange equipment in intimate contact with a suitable anion exchange material such as a strongly basic alkylamine-type synthetic resin. An example of a suitable resin disclosed by the patent is that known commercially by the designation "Ameberlite IRA-400." After suitable alkaline eluting procedures to remove molybdenum and other impurities retained by the resin, the resin is rinsed and again eluted with a dilute solution of a strong mineral acid to remove the rhenium. Although HCl, $HNO_3$ and $H_2SO_4$ are disclosed as useful for this purpose, the preferred reagent is perchloric acid. Rhenium sulfide ($Re_2S_7$) is precipitated from the rhenium-bearing acid solution by contacting the solution with a sulfide, preferably $H_2S$ gas. The rhenium sulfide is then decomposed by an oxidizing agent, such as $H_2O_2$, $HNO_3$ or $O_2$, under pressure in the presence of ammonium hydroxide to form ammonium perrhenate ($NH_4ReO_4$) and ammonium sulphate in solution. The ammonium perrhenate is selectively crystallized from this solution by evaporation.

U.S. Pat. No. 3,244,475 discloses a similar process except that in place of an ion exchange resin a liquid ion exchange material is used to extract the rhenium values from the aqueous rhenium-bearing solution. Thus, according to that patent, rhenium values are removed from aqueous solution by means of an organic extractant comprising a quaternary ammonium compound. The quaternary ammonium compounds disclosed by the patent to be particularly useful are those with the general formula $R_3(CH_3)NCl$, in which the R groups are saturated straight chain $C_8$–$C_{10}$ hydrocarbon groups. One particularly useful extractant is tricapryl methyl ammonium chloride (available commercially under the trade name "Aliquat 336" from General Mills Corporation) carried in kerosene. According to the patent, the aqueous rhenium-bearing solution is treated with an oxidizing agent to convert the dissolved molybdenum to its +6 oxidation state and the dissolved rhenium to its +7 oxidation state. The solution is then adjusted to an alkaline pH, preferably between about 10 to about 12. It is then contacted with the organic extractant to selectively remove the rhenium. Rhenium is recovered from the organic solution by contacting the organic phase with dilute perchloric acid. The rhenium is thereby transferred to the aqueous phase as perrhenic acid. Rhenium sulfide is precipitated from the acid solution, the rhenium sulfide is redissolved in the presence of an oxidizing agent and ammonia, and ammonium perrhenate is crystallized; all in much the same fashion as is disclosed in U.S. Pat. No. 2,876,065.

It is also known to recover rhenium compounds other than ammonium perrhenate from ammonium perrhenate solutions such as those prepared in accordance with the prior art. Thus, for example, the aforesaid Pat. No. 2,867,065, the disclosure of which is incorporated herein by reference to constitute a part of the instant disclosure, discloses techniques for recovering other rhenium compounds, such as rhenium salts and metal perrhenates.

The aforesdescribed prior art methods produce high purity perrhenates, notably ammonium perrhenate. However, they require a number of process steps involving the use of several chemical reagents to remove the rhenium values from the ion exchange materials and to convert these values to the desired product. For optimum results, these processes depend upon the use of perchloric acid which limits the materials of construction for process equipment and introduces some hazard to the system. Perchloric acid is costly and is consumed by the process without opportunity for regeneration.

SUMMARY OF THE INVENTION

The present invention eliminates the need for perchloric acid and replaces the several reagents and steps required by the prior art to recover ammonium perrhenate from an ion exchange material with a simplified process requiring only a single reagent.

According to this invention, rhenium is removed from a rhenium-loaded ion exchange material by means of an aqueous thiocyanate solution, preferably an ammonium thiocyanate solution. The rhenium-loaded ammonium thiocyanate solution is then evaporated, to crystallize pure ammonium perrhenate crystals. Thesec crystals are particularly useful for the production of rhenium metal. However, if preferred, the rhenium-loaded ammonium thiocyanate solution may be used as a starting material for the production of other perrhenates or rhenium salts.

According to the present invention, pure ammonium perrhenate crystals can be recovered directly from the thiocyanate solution by crystallization. The ammonium thiocyanate solution thus replaces the perchloric acid, hydrogen sulfide, hydrogen peroxide and ammonium peroxide of the prior art processes. Several filtering and dissolving procedures required by these prior art processes are also eliminated.

THE DRAWING

The single figure of the drawing is a flowsheet illustrating what is presently contemplated as the best mode of carrying out the invention.

DETAILED DESCRIPTION OF ILLUSTRATED EMBODIMENT

As illustrated, a heading solution of rhenium in aqueous solvent is contacted in conventional manner with an appropriate ion exchange material, either solid or liquid, to effect selective transfer of the rhenium values to the ion exchange material. In this fashion, rhenium is separated from substantially all of the other metals in the aqueous solution. The procedures and reagents disclosed by the aforesaid Pat. Nos. 3,244,475 and 2,876,065 for the extraction of rhenium values from aqueous solution are useful in the present process. Thus, the preferred liquid extractant is a quaternary ammonium compound in an inert organic solvent. Useful quaternary ammonium chlorides are available commercially from a variety of sources. These compounds vary somewhat in chemical analysis, but those which do not form emulsions and have low water solubilities, e.g., below about one percent by weight, are generally effective, when used in accordance with the teachings of Pat. No. 3,244,475, to selectively remove rhenium from aqueous solutions while rejecting other metal ions such as molybdenum.

It has now been found that rhenium values may be efficiently removed from the rhenium-bearing ion exchange materials resulting from the hereinbefore described extraction procedures by means of an aqueous thiocyanate solution. The thiocyanate solution is brought into contact with the ion exchange material in conventional manner. For example, when the ion-exchange material is an ion-exchange resin, the thiocyanate solution is used in place of the acid eluting solution of the prior art. When the ion exchange material is an organic liquid extractant, it may be contacted with thiocyanate solution in accordance with conventional stripping techniques. In either case, rhenium is transferred from the ion exchange material to the thiocyanate solution. Thus, a readily recoverable rhenium-bearing thiocyanate solution is formed.

For convenience, the thiocyanate solutions of this invention may be referred to herein as "contact solutions" or "contact media." These terms embrace such solutions used either as eluting solutions or as stripping solutions.

The precise composition of the thiocyanate contact medium depends upon the product desired. For example, if it is desired to produce potassium perrhenate as the sole perrhenate product, potassium thiocyanate solution is employed as the contact medium. Solutions including other water soluble thiocyanates, e.g., barium, or ammonium thiocyanate are employed when the corresponding perrhenate is a desired product. In general any metal thiocyanate with substantial water solubility but with higher water solubility than the corresponding perrhenate when both salts are in solution may be employed in the contact medium. If a mixture of perrhenate salts is desired, it is sometimes convenient to introduce salts including the desired metal moieties to the contact medium. Because ammonium perrhenate is usually the sole desired end product, ammonium thiocyanate solution is usually employed. Such solutions are prepared by dissolving ammonium thiocyanate in aqueous solvent, typically water. In place of ammonium thiocyanate, appropriate quantities of ammonia, or ammonium salt, together with a water soluble thiocyanate may be employed to make up the contact solution.

The contact solutions of this invention may be of any convenient concentration. Sufficient thiocyanate should be present that the aqueous to organic ratio during a stripping operation is within reasonable limits. It is usually preferred to keep the concentration of the solution well below the solubility limit of the thiocyanate to avoid crystallization of the thiocyanate from solution. A one molar ammonium thiocyanate solution is useful, for example. Concentrations of less than 0.1 molar, although operable, are generally undesirable because of the excessive amount of water, per gram of rhenium, introduced to the crystallization step when such dilute solutions are employed. The percentage of the rhenium removed from an ion exchange material by a prescribed contact time with a prescribed quantity of contact medium increases as the concentration of thiocyanate in the contact medium is increased. Thiocyanate concentrations between about 0.5 and about 2.0 molar are presently preferred because they generally result in optimum efficiency of the overall process. Concentrations above 5 molar tend to remove rhenium from the ion exchange medium in quantities which exceed the solubility limit of the perrhenate product. The resulting perrhenate precipitate is likely to be entrapped in a solid resin. In any event the precipitate must be separated from the ion exchange material, thereby introducing a complication to the process.

Embodiments employing high concentrations of thiocyanate are nevertheless within contemplation. According to these embodiments, sufficient thiocyanate is present in the contact medium to extract rhenium in such quantities that the solubility limit of the corresponding perrhenate is exceeded. Consequently, the perrhenate precipitates out of the loaded contact solution. The solution is filtered to recover the precipitate. The thiocyanate solution may then be treated for recovery of further rhenium salts or it may be recycled. The concentration of the thiocyanate solutions useful in the practice of these embodiments generally exceeds 2 molar, and is typically 5 molar or more.

The stripping operations of this invention may be conducted in conventional equipment in either a batch or continuous fashion at ambient or elevated temperatures and pressures. Ambient or existing process temperatures, i.e., the temperatures incidentally resulting from preceeding process steps, are usually most convenient. As in the case of the extraction step, the organic to aqueous volume ratio during the stripping procedure may vary within wide limits, typically 20:1 to 1:20. Contact time and the number of stages required are also variable. The pH of the contact medium is not critical. The stripping medium may be either very acid, very basic or any intermediate pH with very little variance in stripping efficiency.

High purity ammonium perrhenate crystals are recovered from the rhenium-loaded contact solution by well known crystallization techniques. For example, the solution may be concentrated by evaporation until the perrhenate crystals precipitate from solution. Usually it is preferred to evaporate the solution until it is concentrated and then cool the concentrated solution to crystallize $NH_4ReO_4$.

The following examples further illustrate the invention.

EXAMPLE I

A rhenium-bearing organic solution was prepared by contacting an organic extractant containing 5 volume percent Aliquat 336, 5 volume percent tridecyl alcohol and 90 volume percent kerosene with an aqueous rhenium-bearing solution. The organic phase was separated and found to contain 7.7 grams rhenium per liter. Separate fractions of the rhenium-loaded organic solution were contacted, at an organic to aqueous ratio of 8 to 5, with the stripping solutions listed in Table 1. The percent rhenium stripped by a single contact of each solution for a period of three minutes is reported in the table.

TABLE 1

| Aqueous stripping solution: | Rhenium percent stripped |
|---|---|
| One Molar $NH_4SCN$ | 71 |
| One Molar $NH_4SCN$ plus 1 Molar HCl | 67 |
| One Molar $NH_4SCN$ plus 1 Molar HCl adjusted to pH 9.2 with $NH_4OH$ | 73 |

This example shows that the presence of chloride in the stripping solution doesn't significantly affect the stripping procedure.

EXAMPLE II

A quantity of organic extractant containing 5 percent by volume "Adogen 468," 5 volume percent tridecyl alcohol and 90 volume percent kerosene was loaded to 11.7 grams rhenium per liter. "Adogen 468" is a quaternary ammonium chloride available commercially from Archer Daniels Midland Company. This material has the general formula $R_3(CH_3)NCl$, where R predominates in $C_8$, $C_{10}$ and $C_{12}$ carbon chain lengths. Equilibrium data between this organic solution and 1 molar ammonium thiocyanate solution at various volume ratios is reported in Table 2.

TABLE 2

| Volume ratio, aqueous to organic | Grams rhenium per liter | |
|---|---|---|
|  | Organic | Aqueous |
| 10:1 | 0.24 | 1.12 |
| 5:1 | 0.47 | 2.13 |
| 2:1 | 1.04 | 5.52 |
| 1:1 | 1.90 | 9.64 |
| 1:10 | 5.15 | 19.5 |

EXAMPLE III

Rhenium-bearing solution from the rhenium recovery circuit of a commercial molybdic oxide plant was adjusted to pH 9.5. The solution was completely oxidized by contacting it with chlorine. The solution was filtered. The clear filtered solution contained 0.73 grams per liter rhenium and 18.8 grams per liter molybdenum.

Four-stage countercurrent extraction shaker tests were made using the thus-prepared aqueous plant solution and fresh organic extractant such as that described in Example II. The aqueous to organic ratio employed was 10 to 1. Equilibrium data for each stage are reported in Table 3.

TABLE 3

|  | Aqueous phase | | Organic phase | |
|---|---|---|---|---|
|  | Re gram/liter | Mo gram/liter | Re gram/liter | Mo gram/liter |
| Extraction stage: |  |  |  |  |
| 1 | 0.234 | 21.0 | 7.48 | 0.0004 |
| 2 | 0.064 | 20.8 | 3.52 |  |
| 3 | 0.026 | 20.8 | 0.664 | 0.008 |
| 4 | 0.010 | 19.5 | 0.294 | 0.004 |

Thus, a raffinate solution containing only 0.01 gram rhenium per liter was produced while virtually no molybdenum was removed from the aqueous heading solution. Rhenium extraction efficiency was 98.6 percent.

Four-stage countercurrent stripping shaker tests were made with the loaded organic phase (7.48 grams rhenium per liter) from the extraction tests. A volume ratio of 2 parts organic solution to 1 part 1-molar aqueous ammonium thiocyanate solution was used. Equilibrium data for each stage is reported in Table 4.

TABLE 4

|  | Aqueous phase | | Organic phase | |
|---|---|---|---|---|
|  | Re gram/liter | Mo gram/liter | Re gram/liter | Mo gram/liter |
| Extraction stage: |  |  |  |  |
| 1 | 15.1 | 0.004 | 3.29 | 0.001 |
| 2 | 5.88 |  | 1.58 | 0.002 |
| 3 | 2.00 | 0.009 | 0.51 | 0.004 |
| 4 | 0.74 | 0.007 | 0.184 | 0.001 |

Thus, solution containing 15.1 grams rhenium and only very minor amounts of molybdenum was produced from a starting solution containing only 0.73 grams rhenium and 18.8 grams molybdenum per liter.

Rhenium-loaded ammonium thiocyanate solutions from three separate stripping tests were evaporated until crystals started to form. The thus-concentrated solutions were then cooled to room temperature. The ammonium perrhenate crystals crystallized from these solutions were found to be of extremely high purity. The samples analyzed, respectively, 0.02, 0.015 and 0.0001 percent by weight molybdenum.

Even higher purity crystals can be obtained by redissolving the crystal crop and recrystallizing in accordance with well known crystallizing techniques. The present invention produces ammonium perrhenate crystals of superior quality. The prior art step of forming rhenium sulfide is eliminated thereby removing a source of contamination.

EXAMPLE IV

Roaster gas scrubber solution from a commercial molybdic oxide plant was completely oxidized with chlorine. The oxidized solution was adjusted to pH 12 by the addition of sodium hydroxide. The solution was filtered. The filtrate, containing 0.32 grams per liter rhenium and 7.50 grams per liter molybdenum, was passed downflow through a column containing 23 milliliters of "Dowex 1" ion exchange resin. "Dowex 1" is the trade name of a strong base anion resin containing quaternary ammonium functional groups. It is commercially available from the Nalco Chemical Company. The resin had been previously eluted with one-molar ammonium thiocyanate solution and rinsed with water.

Rhenium recovery from the conditioned scrubber solution passing through the column was 99.8 percent until the resin had absorbed 55.5 milligrams of rhenium per milliliter of resin. The rhenium content of the effluent, gradually increased after this initial "breakthrough." Scrubber solution was passed through the column until the resin was loaded with 89.7 milligrams of rhenium per milliliter of resin and the effluent from the column contained 43.8 percent of the rhenium content of the heading (scrubber) solution. Less than 0.3 percent of the molybdenum of the heading solution was absorbed by the resin.

The rhenium was recovered from the resin by eluting the resin with a one-molar solution of ammonium thiocyanate in water. Table 5 reports the concentration and weight percent distribution of rhenium in successive fractions of the eluant.

TABLE 5

| | Volume of fraction, ml. | Rhenium concentration, grams per liter | Weight percent total rhenium |
|---|---|---|---|
| Fraction of thiocyanate eluant: | | | |
| 1 | 67 | 8.62 | 26.8 |
| 2 | 51 | 12.2 | 28.9 |
| 3 | 60 | 9.9 | 27.6 |
| 4 | 49 | 6.65 | 15.1 |
| 5 | 52 | 0.57 | 1.4 |
| 6 | 56 | 0.10 | 0.2 |
| Total | | | 100.00 |

This example shows that rhenium is readily absorbed on a strong base anion exchange resin which has been previously eluted with ammonium thiocyanate solution. The data of Table 5 shows that rhenium is effectively removed from the resin by elution with an ammonium thiocyanate solution.

Three closed circuit cycles were run in a laboratory system arranged as illustrated in the drawing. "Dowex 1" was used as the ion exchange resin. Pertinent data concerning the specific runs are reported in Table 6.

In each cycle, the heading solution was passed downflow through the ion exchange column until the resin was loaded to the levels reported in the table. The heading solution was drawn from a commercial plant and varied in composition with time between 0.29 to 0.36 gram per liter rhenium and 5.5 to 30.6 grams per liter molybdenum. Flow of the heading solution through the resin was terminated when the rhenium analysis in the effluent reached a predetermined level as reported in Table 6. Essentially all of the molybdenum passed through the resin. The resin was then eluted with one molar ammonium thiocyanate solution. Fractions of the rhenium-loaded eluting solution were recovered from the column. The rhenium-lean fractions were recycled for use as eluting solutions in succeeding cycles. Virtually 100 percent of the rhenium was removed from the resin in each cycle. The rhenium-rich fractions were evaporated at about 100° C. at atmospheric pressure until crystals began to form. The concentrated solution was then cooled to ambient temperature. The resulting crystal crop was recovered by filtration. The filtrate was diluted to a concentration of one molar ammonium thiocyanate and was recycled for use as eluting solution in succeeding cycles. The recycled filtrate contained about 1 to 2 grams rhenium per liter. Elution in each cycle was completed by using fresh one molar ammonium thiocyanate solution as the last fraction of eluting solution. All of the eluting solution introduced during the first cycle was fresh, i.e., it had not been recycled.

The impurity analyses of the crude crystal products are reported in Table 6. These products were additionally purified by redissolving the crystals in hot water near its boiling point. The resulting solution was cooled to recrystallize the $NH_4ReO_4$. In practice, the mother liquor from the recrystallization procedure may be recycled to the high temperature evaporation step. The impurity analyses of the recrystallized products are also reported in Table 6.

TABLE 6.—OPERATING DATA

| Cycle | Effluent analysis at resin-loading cutoff point Re, gram/liter | Loading of resin, grams Re/liter resin | Percent recovered from thiocyanate solution | Weight percent impurities in crude crystals | | | | | Weight percent impurities in recrystallized $NH_4 ReO_4$ | | | | |
|---|---|---|---|---|---|---|---|---|---|---|---|---|---|
| | | | | Mo | Ca | Fe | Al | S | Mo | Ca | Fe | Al | S |
| 1 | 0.16 | 57.4 | 86.4 | 0.84 | 0.1 | 0.01 | 0.01 | 0.06 | 0.075 | 0.001 | 0.001 | 0.001 | 0.01 |
| 2 | 0.19 | 62.2 | 87.4 | 0.49 | 0.6 | 0.01 | 0.02 | 0.16 | 0.022 | 0.04 | 0.005 | 0.001 | 0.01 |
| 3 | 0.12 | 49.9 | 85.0 | 0.11 | 0.005 | 0.02 | 0.01 | 0.025 | 0.02 | 0.005 | 0.01 | 0.001 | 0.01 |

This example demonstrates the recycling of the contact solution doesn't decrease the efficiency of rhenium elution from the ion exchange resin. Purity of the product is not impaired by recycling the thiocyanate solution.

Reference herein to details of the presently preferred embodiments is not intended to limit the scope of the claims. Many modifications will occur to those skilled in the art without departing from the inventive subject matter described and claimed herein.

What is claimed is:

1. In the process of recovering rhenium values as a perrhenate from a solution containing rhenium and other metals in an aqueous solvent by contacting the solution with an ion exchange medium, thereby to effect the selective transfer of rhenium values from the aqueous solution to the ion exchange medium, and removing the rhenium from the ion exchange medium by contacting the rhenium-bearing ion exchange medium with an aqueous solution, the improvement which comprises contacting the rhenium-bearing ion exchange medium with an aqueous solution of a thiocyanate having a higher water solubility than the perrhenate to effect the transfer of rhenium values from said rhenium-bearing ion exchange medium to said thiocyanate solution, thereby to form a separable rhenium-bearing aqueous thiocyanate solution; and recovering the perrhenate from said aqueous thiocyanate solution.

2. The impovement of claim 1 wherein the rhenium-bearing ion exchange medium is contacted with an aqueous solution of a thiocyanate selected from the group consisting of the thiocyanates of ammonia, potassium, and barium to effect the transfer of rhenium values from the ion exchange medium to the thiocyanate solution and the rhenium-bearing thiocyanate solution is recovered.

3. The improvement of claim 2 wherein the thiocyanate solution is a solution of ammonium thiocyanate and the recovered rhenium-bearing ammonium thiocyanate solution is evaporated to crystallize ammonium perrhenate.

4. The improvement of claim 1 wherein the ion exchange medium comprises a quaternary ammonium chloride carried in kerosene.

5. The improvement of claim 4 wherein the thiocyanate solution is an aqueous solution of ammonium thiocyanate.

6. The improvement of claim 1 wherein the ion exchange medium is an anionic ion exchange resin.

7. The improvement of claim 6 wherein the thiocyanate solution is an aqueous solution of ammonium thiocyanate.

8. The improvement of claim 7 wherein the rhenium-bearing aqueous ammonium thiocyanate solution is evaporated until crystals begin to form; is then cooled to cause ammonium perrhenate to crystallize; and the crystals are recovered.

9. The improvement of claim 2 wherein the thiocyanate solution is sufficiently concentrated with respect to the thiocyanate that it is capable of extracting rhenium in excess of the solubility limit of the corresponding perrhenate; the thiocyanate solution is brought into contact with the ion exchange medium for sufficient duration to extract sufficient rhenium therefrom to cause the corresponding perrhenate to precipitate; and the precipitate is recovered from the thiocyanate solution.

10. The improvement of claim 9 wherein the thiocyanate solution is an ammonium thiocyanate solution of more than 2 molar concentration.

11. The improvement of claim 1, wherein rhenium is recovered from the rhenium-bearing aqueous thiocyanate solution as a rhenium salt.

References Cited

UNITED STATES PATENTS

| 2,809,092 | 10/1957 | Zimmerly et al. | 23—15.5 |
| 2,876,065 | 3/1959 | Zimmerly et al. | 23—22X |
| 3,244,475 | 4/1966 | Churchwald | 23—22 |
| 3,376,104 | 4/1968 | Messner et al. | 23—15.5 |

HERBERT T. CARTER, Primary Examiner

U.S. Cl. X.R.

23—24, 51